US011247775B2

(12) United States Patent
Brock et al.

(10) Patent No.: US 11,247,775 B2
(45) Date of Patent: Feb. 15, 2022

(54) APPARATUSES FOR SECURING DRONES DURING TRANSPORT AND METHODS OF USE

(71) Applicant: Ford Global Technologies, LLC, Dearborn, MI (US)

(72) Inventors: Nelson Brock, Palo Alto, CA (US); Joseph Bell, Antioch, CA (US); James Carthew, Oakland, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 16/232,478

(22) Filed: Dec. 26, 2018

(65) Prior Publication Data

US 2020/0207470 A1 Jul. 2, 2020

(51) Int. Cl.
*B64C 39/02* (2006.01)
*B64F 1/00* (2006.01)

(52) U.S. Cl.
CPC .......... *B64C 39/024* (2013.01); *B64C 39/022* (2013.01); *B64F 1/005* (2013.01); *B64C 2201/18* (2013.01); *B64C 2201/208* (2013.01)

(58) Field of Classification Search
CPC ........ B64C 2201/208; B64C 2201/148; B64C 2201/18; B64C 39/022; B64C 39/024; B60P 3/11; B64F 1/005
See application file for complete search history.

(56) References Cited

U.S. PATENT DOCUMENTS

| | | | | |
|---|---|---|---|---|
| 7,149,611 | B2* | 12/2006 | Beck | B60K 17/046 701/2 |
| 9,056,676 | B1* | 6/2015 | Wang | B64F 1/007 |
| 9,952,022 | B2* | 4/2018 | Ueno | G05D 1/0094 |
| 10,207,820 | B2* | 2/2019 | Sullivan | B64F 1/362 |
| 10,773,800 | B2* | 9/2020 | Buyse | B64C 39/022 |
| 2011/0133378 | A1* | 6/2011 | Dunn | F16F 3/02 267/217 |
| 2015/0102154 | A1* | 4/2015 | Duncan | G05D 1/0094 244/2 |
| 2016/0001883 | A1* | 1/2016 | Sanz | H02J 7/0044 244/17.23 |
| 2016/0144982 | A1 | 5/2016 | Sugumaran | |
| 2016/0355257 | A1* | 12/2016 | Chappell | B64C 27/52 |
| 2016/0364989 | A1* | 12/2016 | Speasl | G08G 5/0082 |

(Continued)

FOREIGN PATENT DOCUMENTS

WO    2018/089859 A1    5/2018

OTHER PUBLICATIONS

Baca, et al., "Autonomous Landing on a Moving Car With Unmanned Aerial Vehicle," 2017 European Conference on Mobile Robots (ECMR), Paris, 2017, pp. 1-6. doi: 10.1109/ECMR.2017.8098700.

*Primary Examiner* — Christopher D Hutchens
(74) *Attorney, Agent, or Firm* — Brandon Hicks; Eversheds Sutherland (US) LLP

(57) ABSTRACT

Apparatuses for securing drones during transport and methods of use are disclosed herein. An example apparatus includes a structural panel of a vehicle having a compartment configured to receive and retain a drone, a retractable cover member configured to at least partially cover the compartment to create an enclosure around the drone, and a drone securement assembly that retains the drone within the enclosure so as to prevent the drone from displacement during vehicle operation.

6 Claims, 7 Drawing Sheets

(56) References Cited

U.S. PATENT DOCUMENTS

| | | | |
|---|---|---|---|
| 2017/0036777 A1* | 2/2017 | Martin | B64F 1/12 |
| 2018/0141658 A1* | 5/2018 | Baur | B60R 1/00 |
| 2019/0106224 A1* | 4/2019 | Nishikawa | B64C 27/08 |
| 2020/0017210 A1* | 1/2020 | Neubecker | E05F 15/70 |
| 2020/0033846 A1* | 1/2020 | Buyse | G05D 1/0022 |
| 2020/0407057 A1* | 12/2020 | Brock | G07C 5/008 |

* cited by examiner

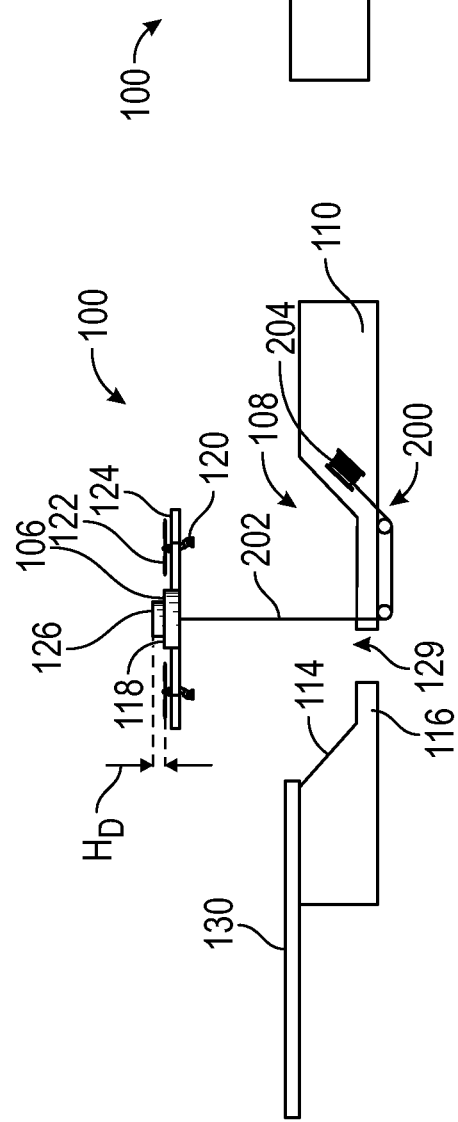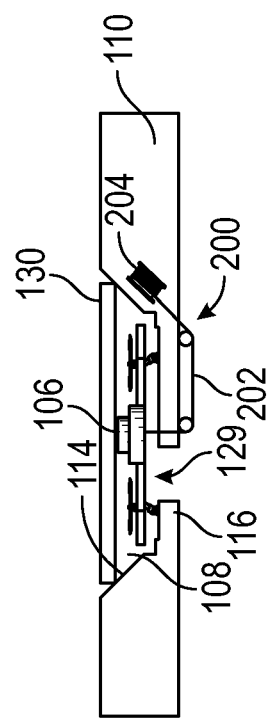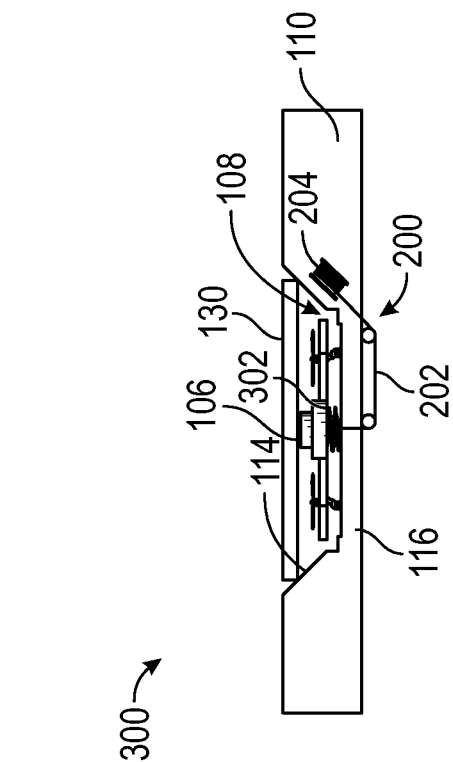

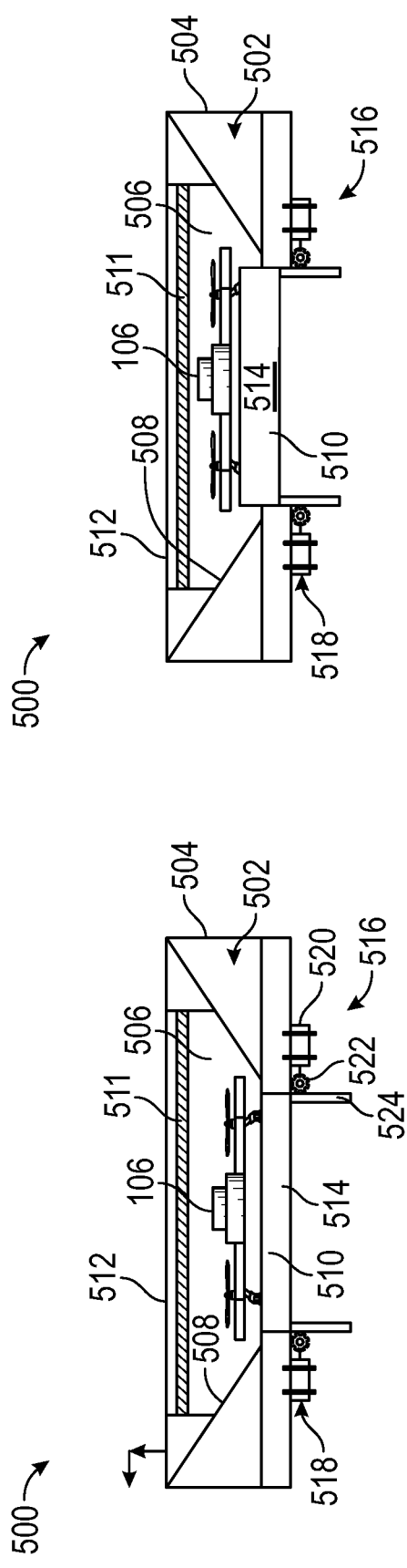
FIG. 5A
FIG. 5B
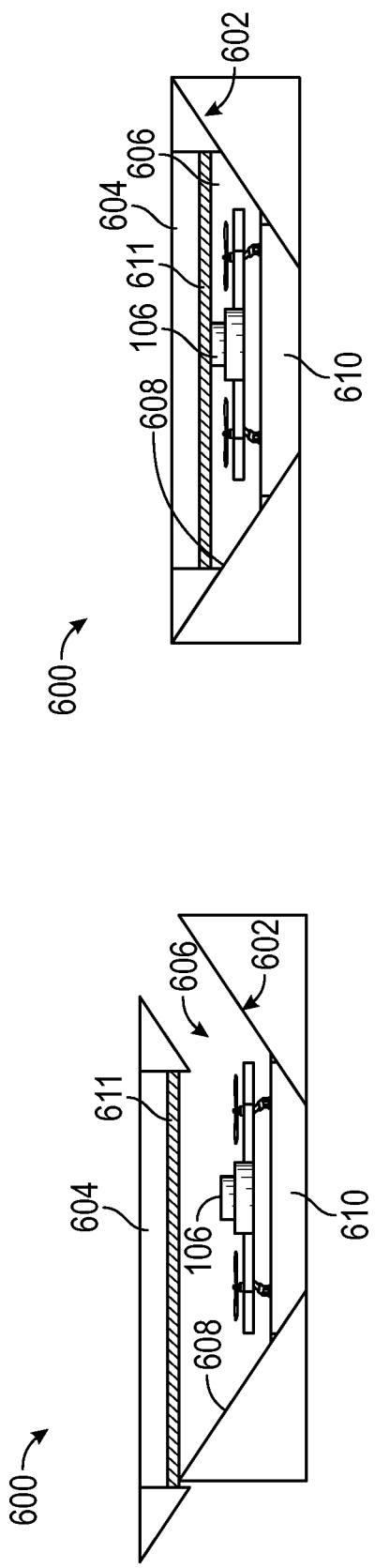
FIG. 6A
FIG. 6B

APPARATUSES FOR SECURING DRONES DURING TRANSPORT AND METHODS OF USE

FIELD OF THE DISCLOSURE

The disclosure generally relates to unmanned aerial vehicles (e.g., drones) and to apparatuses for securing the drones during transport and methods of use. These apparatuses and methods allow a drone to be secured in a compartment of a vehicle, for example, when the vehicle is in motion.

BACKGROUND

Vehicle-based drone launching and recovery can result in damage to the drone due to errors during launching and landing procedures. For example, the body or rotors of the drone may be damaged if they contact parts of the vehicle. Moreover, when the drone is in a stored configuration relative to the vehicle, the drone may be damaged when the vehicle is in motion. A stored drone is also more likely to sustain damage when the vehicle is operating in rough terrain. Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 2A and 2B collectively illustrate an example apparatus of the present disclosure having a tether-based drone securement assembly.

FIGS. 3A and 3B collectively illustrate an example apparatus of the present disclosure having a tether-based drone securement assembly with a resilient damping mechanism.

FIGS. 5A and 5B collectively illustrate an example apparatus of the present disclosure having a translating base member drone securement assembly.

FIGS. 6A and 6B collectively illustrate an example apparatus of the present disclosure having a translating retractable cover member drone securement assembly.

DETAILED DESCRIPTION

Overview

In general, the present disclosure is directed to apparatuses for securing drones during vehicle movement. In some embodiments, an example apparatus may include a structural panel of a vehicle that has been constructed to have a compartment. In some embodiments, the compartment can be defined by an angled sidewall and a base member formed in the structural panel. Generally, the compartment may be configured to receive and retain a drone. In some embodiments, the apparatus may comprise a retractable cover member configured to at least partially cover the compartment to create an enclosure around the drone. Additionally, the apparatus can include a drone securement assembly that retains the drone within the enclosure so as to prevent the drone from displacement during vehicle operation.

The drone securement assembly can comprise any one or a combination of components configured to prevent the drone from displacement during vehicle operation. In one embodiment, the drone securement assembly can comprise a tensioned tether. In some embodiments, the drone securement assembly can comprise magnetic securement elements. In various embodiments, the drone securement assembly can comprise compression of the drone inside the compartment between the retractable cover member and a base member. In certain embodiments, compression of the drone inside the compartment can also be performed using a stabilizer assembly integrated into the drone. The stabilizer assembly can also be used with any of the other embodiments to prevent rotational and/or sliding movement of the drone. To be sure, each of the drone securement assemblies described above can be combined together, in whole or in part. For example, the tensioned tether could be used in combination with the magnetic securement elements and/or drone compression.

In some embodiments, the structural panel of a vehicle includes a roof panel of the vehicle that forms a portion of the cabin of the vehicle. In another embodiment, the structural panel could include a bed cover of a truck. In some instances, the compartment formed in the structural panel can include a base member as noted above, and this base member can comprise an aperture. The aperture allows a user to access the drone within the cabin of the vehicle for purposes such as drone maintenance. These and other advantages of the present disclosure are disclosed herein in greater detail with the reference to the collective drawings.

ILLUSTRATIVE EMBODIMENTS

Figure 1A:
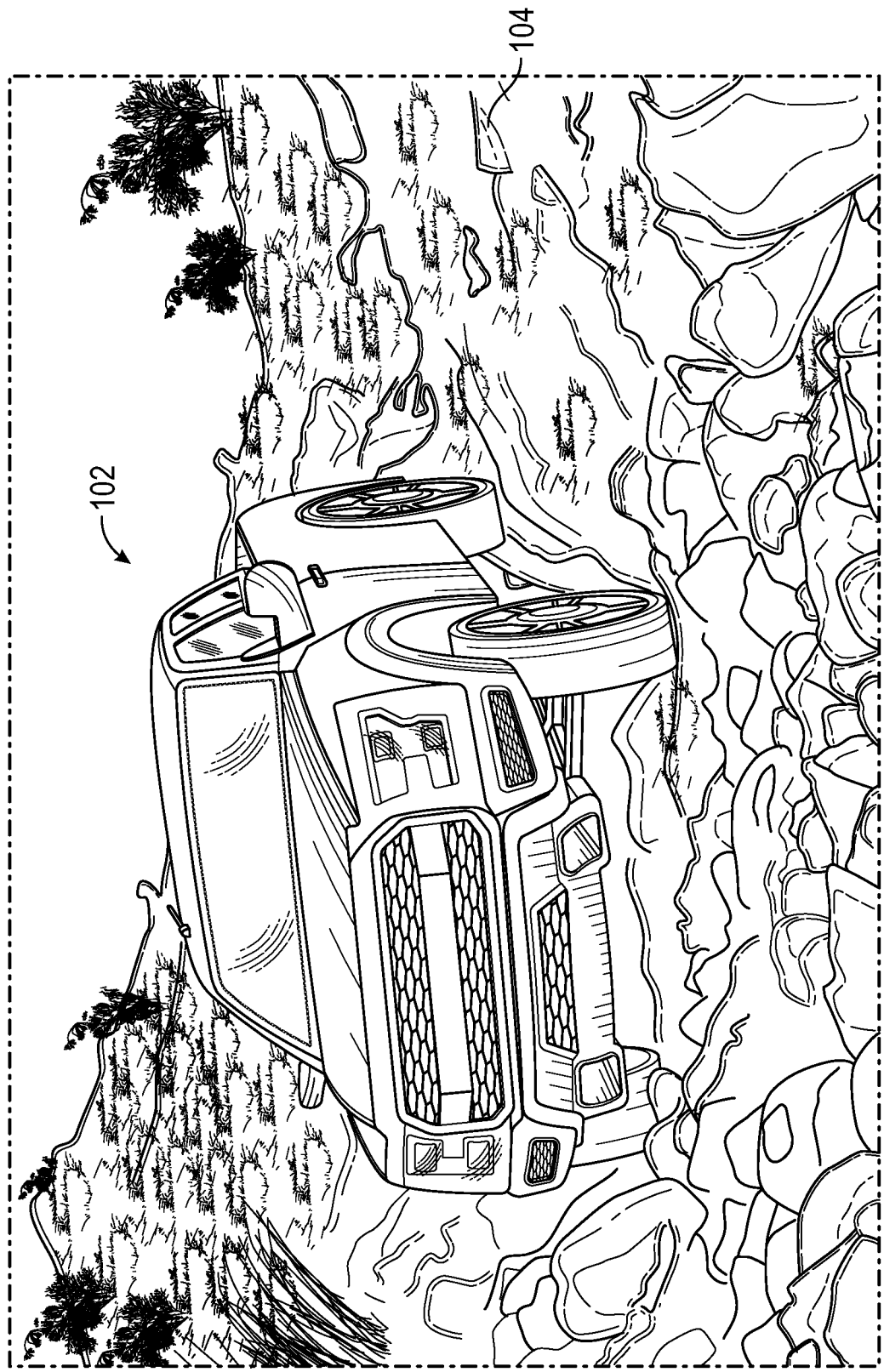
FIG. 1A is a perspective view that depicts an example vehicle and operating environment for practicing aspects of the present disclosure.
Figure 1B:
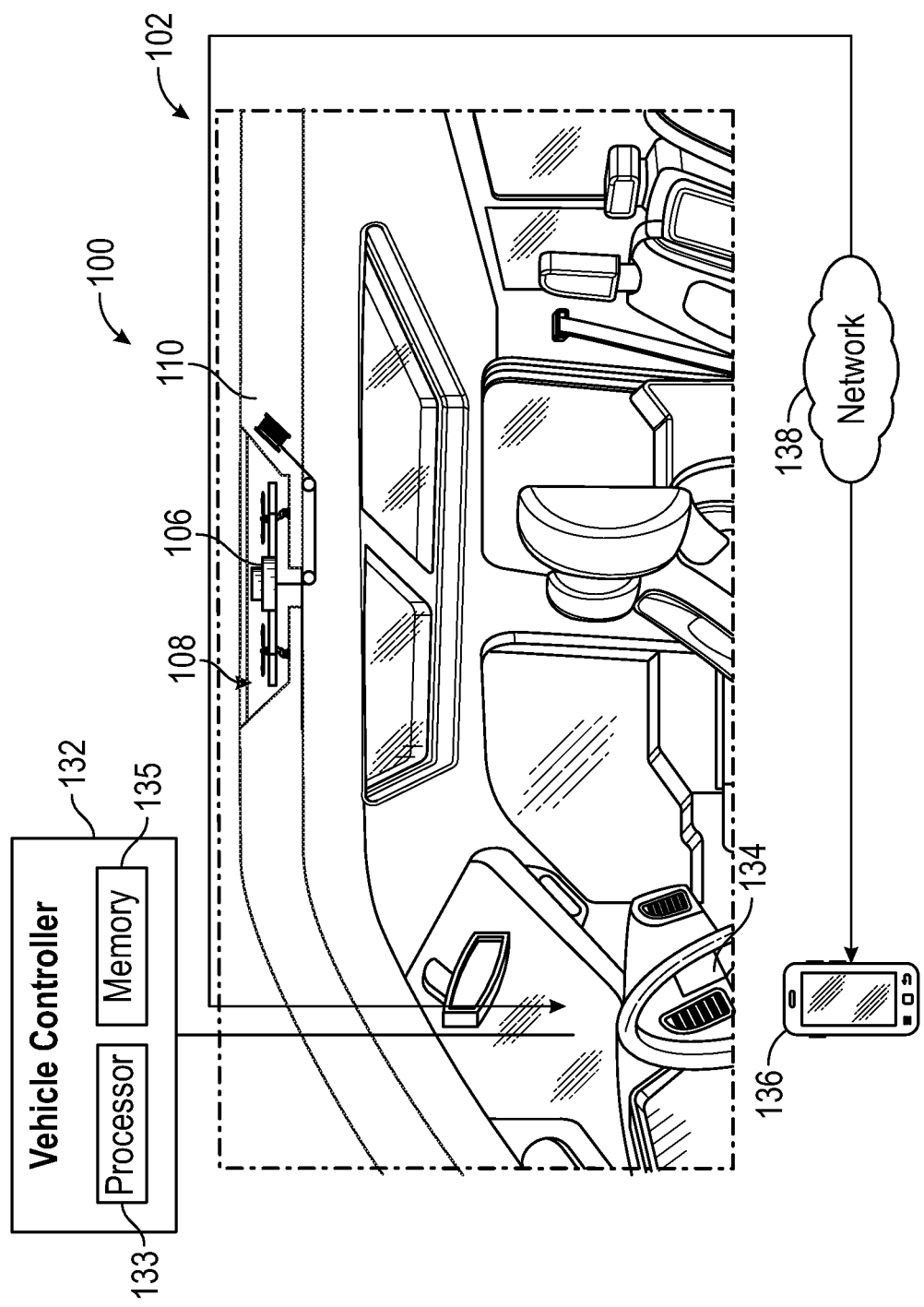
FIG. 1B is a perspective view of the interior of a vehicle that is configured with a drone securement apparatus/assembly of the present disclosure.

Turning now to the drawings, FIGS. 1A and 1B collectively depict an illustrative environment in which techniques and structures for providing the systems and methods disclosed herein may be implemented. The illustrative environment may include a vehicle 102, such as a truck that is traversing over rugged terrain 104. An example apparatus 100 is illustrated as having a drone 106 stored within a compartment 108 of a structural panel 110 of the vehicle 102. While some examples may reference specific vehicles such as a truck, the apparatuses disclosed herein can be alternatively utilized in other environments such as marine environments where a drone can be stored in a compartment formed in a ship.

Referring now to FIGS. 2A and 2B collectively, according to some embodiments, the example apparatus 100 of the present disclosure comprises a structural panel 110 formed to have the compartment 108. In one embodiment, the compartment 108 is defined by an angled sidewall 114 and a base member 116 formed in the structural panel 110. While the apparatus 100 illustrated in FIG. 1B corresponds to the apparatus or drone securement assembly 200 illustrated in FIG. 2B, the apparatus 100 can include any of the apparatuses disclosed herein.

In general, the angled sidewall 114 and the base member 116 cooperate to form a substantially frusto-conical cavity that receives the drone 106. The angled sidewall 114 is provided to guide the drone 106 in the general direction towards the base member 116. Correspondingly, as best illustrated in FIG. 2A, the drone 106 comprises a drone body 118, a plurality of feet, such as foot 120 (also referred to as a landing member), a plurality of rotors, such as rotor 122, and landing guards such as landing guard 124. In some instances, the landing guards can be disposed around and underneath each of the plurality of rotors to prevent the plurality of rotors from contacting the angled sidewall 114. In some embodiments an upper surface 126 of the drone body 118 extends above the plurality of rotors. This height difference HD is relevant in some configurations that involve compression of the drone 106, as will be disclosed in greater detail infra.

In one or more embodiments, the base member 116 comprises an aperture 129 that allows a user within the cabin of the vehicle 102 to access the drone 106. For example, a user can reach inside the compartment 108 and change a battery of the drone 106 or change one or more of the rotors 122 of the drone 106.

In some embodiments, the compartment 108 can be configured to receive and retain the drone 106. The apparatus 100 also comprises a retractable cover member 130 that can be configured to at least partially cover the compartment 108 to create an enclosure around the drone 106. An enclosure formed by the retractable cover member 130 over the compartment can have a height that is larger in dimension than an overall height of the drone 106. As noted above, this difference in height is referenced as HD in FIG. 2A.

In accordance with the present disclosure, the apparatus 100 may also include a drone securement assembly 200 that retains the drone 106 within the enclosure so as to prevent the drone 106 from displacement during vehicle operation. In this embodiment, the drone securement assembly 200 comprises a tether 202 and reel 204. The tether 202 can travel through one or more guides, such as wheels or pulleys, in some instances.

When the drone 106 is deployed, the retractable cover member 130 is moved into an open configuration as in FIG. 2A. Conversely, when the drone 106 is in a stored configuration, the retractable cover member 130 can be moved into a closed configuration as in FIG. 2B. In general, the tether 202 is coupled to the drone 106 using any acceptable means, and the reel 204 can be used to retract and release the tether 202.

In this particular embodiment, the drone 106 can be recovered by operation of the reel 204 that spools the tether 202. As the tether 202 is spooled onto the reel 204, the drone 106 is pulled into the compartment 108. As noted above, during this process, the landing guard(s) 124 of the drone 106 prevent the rotor(s) 122 from contacting the angled sidewall 114. When the drone 106 contacts the base member 116, the reel 204 is used to place the tether 202 in tension, which causes the foot/feet 120 of the drone 106 to be securely drawn against the base member 116. In another embodiment, the reel 204 is used to place the tether 202 in tension, which causes the landing guard 124 of the drone 106 to be securely drawn against the angled sidewall 114 of the compartment 108. Either configuration cinches the drone 106 into securement as tension is applied to the tether 202.

The retractable cover member 130 can be closed as in FIG. 2B when the drone 106 is secured. In general, the drone 106 is secured so as to prevent the drone 106 from displacing when the vehicle 102 is in operation. In various embodiments, the inner surfaces of the retractable cover member 130 and/or the compartment 108 can be lined with a protective material, such as an elastomer or textile that protects the drone 106 when it is enclosed.

Referring to FIGS. 1B, 2A, and 2B collectively, the reel 204 can be operated through use of a vehicle controller 132 and a human machine interface (HMI) 134 of the vehicle 102. The user can perform operations such as reeling in and/or out the drone 106 using the HMI 134. The HMI 134 provides graphical user interfaces (GUIs) used to provide controls for operating the apparatus 100 and/or the drone 106. Also, operation of the retractable cover member 130 can be performed using the HMI 134. It will be understood that the features disclosed as being controllable through the HMI 134 can likewise be controlled using an apparatus and/or drone control application provided on a smartphone 136. In some embodiments, the smartphone 136 can communicate with the vehicle controller 132 over a network 138.

The network 138 may include any one or a combination of multiple different types of networks, such as cable networks, the Internet, wireless networks, and other private and/or public networks. In some instances, the network 138 may include cellular, Wi-Fi, or Wi-Fi direct. In some embodiments, the smartphone 136 can communicate with the vehicle controller 132 using device-to-device communication over a short range wireless connection such as Bluetooth or near-field communication (NFC). In some embodiments, the vehicle controller 132 can communicate with the drone 106 over the network 138 to indicate to the drone 106 that takeoff or landing is permitted.

In various embodiments, the vehicle controller 132 can comprise, for example, a processor 133 and a memory 135 that have been adapted to provide the features described herein for allowing drone control and control or operation of any of the apparatuses disclosed herein for securing a drone.

FIGS. 3A and 3B collectively illustrate another example drone securement assembly 300. The drone securement assembly 300 comprises the tether 202 and the reel 204 of FIGS. 2A and 2B. Additionally, a resilient member 302 is included to provide damping when the tether 202 is placed into tension. The resiliency added through the use of the resilient member 302 provides damping to counteract movement of the drone 106 due to vehicle movement. In one or more embodiments, the resilient member 302 is mounted to the base member 116.

In some embodiments, the resilient member 302 comprises a compression spring. In some embodiments, the resilient member 302 can be mounted on an underside of the drone body 118 of the drone 106 and/or the foot/feet 120 of the drone 106. In some instances, resilient members are present on both the drone 106 and/or the base member 116. In one or more embodiments, a protective sleeve 304 is placed in a concentric relationship with the resilient member 302 and acts to protect the tether 202 from contacting the resilient member 302. The protective sleeve 304 can include a tubular section of any suitable material such as a plastic, a polymer, a textile, or a natural material such as rubber, a synthetic material, or any combinations and/or permutations thereof. The tether 202 can extend through the protective sleeve 304 in some instances.

Figure 4A:
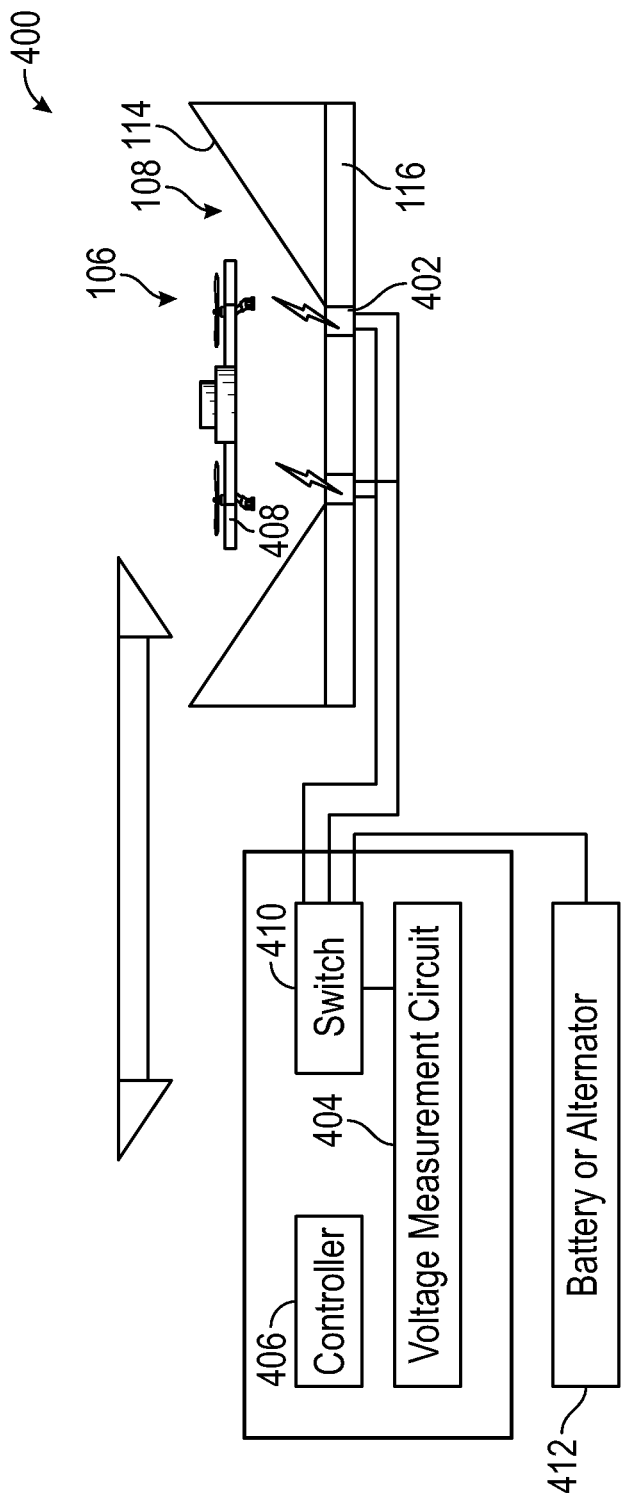
FIGS. 4A and 4B collectively illustrate an example apparatus of the present disclosure having a magnet-based drone securement assembly.
Figure 4B:
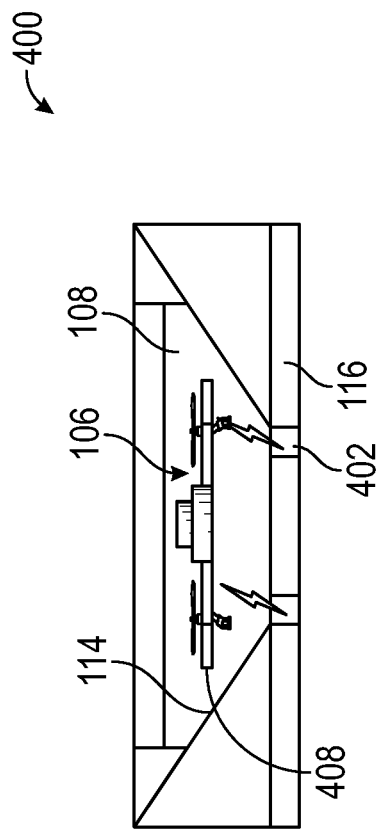

FIGS. 4A and 4B collectively illustrate another example drone securement assembly 400. The drone securement assembly 400 utilizes magnetic and/or electro-magnetic elements to secure the drone 106 within the compartment 108. In some embodiments, the material used to construct or line the compartment 108, such as the angled sidewall 114 and the base member 116 are constructed from non-magnetic materials such as a plastic or a polymer. The base member 116 comprises magnets or electro-magnetic elements such as element 402 (electromagnetic coil). In some instances, the element 402 can be disposed within or on the base member 116.

The element 402 can be coupled to a voltage measurement circuit 404 and a controller 406. In general, the voltage measurement circuit 404 can be configured to sense a presence of the magnetic parts of the drone 106 when the drone 106 is proximate to the element 402. The controller 406 can be used to apply a current to the element 402 to generate a magnetic field to attract a magnet 408 of the drone 106. In some embodiments, a magnet 408 is provided on the drone 106 and can be integrated into the foot/feet 120 and/or the landing guard 124. In some instances, the foot/feet 120 and/or the landing guard 124 are fabricated from a magnetic material that can be attracted by the element 402. In some embodiments, the controller 406, the switch 410, and the voltage measurement circuit 404 can be integrated into or otherwise associated with the base member 116.

In operation, vibrations produced by the drone 106 can be detected by small variations in a voltage measured across the element(s) 402 and interpreted by the controller 406. The element(s) 402 can then be disconnected from the voltage measurement circuit 404 using a switch 410 operated by the controller 406 and supplied with current using the controller 406 to induce a magnetic field using the element(s) 402. The magnetic field can hold the drone 106 in position until the current is no longer supplied. The power required to operate the element(s) 402 can be obtained from a power source of the vehicle 102 such as a battery or alternator 412.

FIGS. 5A and 5B collectively illustrate another example apparatus 500 having an example drone securement assembly 502 that utilizes movement and compression to secure a drone 106 therein (e.g., translating base member). In general, the example apparatus 500 comprises a structural panel 504 of a vehicle that is formed to have a compartment 506 with an angle sidewall 508 and a base member 510. The example apparatus 500 also comprises a retractable cover member 512. In some embodiments, the drone securement assembly 502 includes a portion 514 of the base member 510 that is configured to translate using mechanical actuators 516 and 518. Each of the mechanical actuators can be of similar construction. In some embodiments, additional or fewer mechanical actuators than those illustrated can be utilized.

For example, the mechanical actuator 516 comprises a motor 520, a gear 522, and a track 524. The track 524 is coupled with the portion 514 of the base member 510. When the motor 520 is activated, the gear 522 is turned which causes the track 524 to move either upwardly or downwardly based on a rotational direction of the motor 520. To be sure, the track 524 is configured to cooperate with the gear 522 such that movement of the gear 522 causes movement of the track 524 in a vertical direction.

FIG. 5A illustrates the example drone securement assembly 502 in a disengaged position with the drone 106 in an unsecured configuration, whereas in FIG. 5B the example drone securement assembly 502 is in an engaged position with the drone 106 in a secured configuration. In the secured configuration, the drone 106 is compressed between the portion 514 of the base member 510 and the retractable cover member 512. In some embodiments, the retractable cover member 512 comprises a layer of damping material 511 such as a textile, rubber, elastomer, or other similar material that protects the drone 106 when it is in the secured configuration. In some embodiments, the damping material 511 can be disposed on an underside of the retractable cover member 512. The portion 514 of the base member 510 is configured to translate vertically to compress the drone against the damping material 511. In some embodiments, the portion 514 of the base member 510 can also be provided with a damping material. The damping material 511 can not only prevent excessive compression of the drone 106 but can also absorb movement of the drone from jostling or other movement produced by the operation of an associated vehicle. As noted in the embodiment of FIG. 1A, the operation of the motors (such as motor 520) can be controlled using the vehicle controller 132 and/or the HMI 134 that allows a user of an associated vehicle to launch, retrieve, and/or secure the drone 106.

In some embodiments, rather than translating vertically in an upward manner, the mechanical actuators 516 and 518 can cause the portion 514 of the base member 510 to descend vertically and downwardly so as to allow a user within the vehicle cabin to remove the drone 106 from the compartment 108.

FIGS. 6A and 6B collectively illustrate another example apparatus 600 having an example drone securement assembly 602 that utilizes movement and compression to secure a drone 106 therein. In this embodiment, a retractable cover member 604 is sized and configured to move downwardly within a compartment 606 formed by an angle sidewall 608 and a base member 610 in order to compress the drone 106 between the retractable cover member 604 and the base member 610. As with the embodiments of FIGS. 5A and 5B, the retractable cover member 604 and the base member 610 can be provided with a damping material 611. When the retractable cover member 604 covers the compartment 606, it can slide downwardly towards the drone 106 to compress the drone 106 against the base member 610. As noted in the embodiment of FIG. 1B, operation of the retractable cover member 604 can be controlled using the vehicle controller 132 and/or the HMI 134 that allows a user of an associated vehicle to launch, retrieve, and/or secure the drone 106.

Figure 7A:
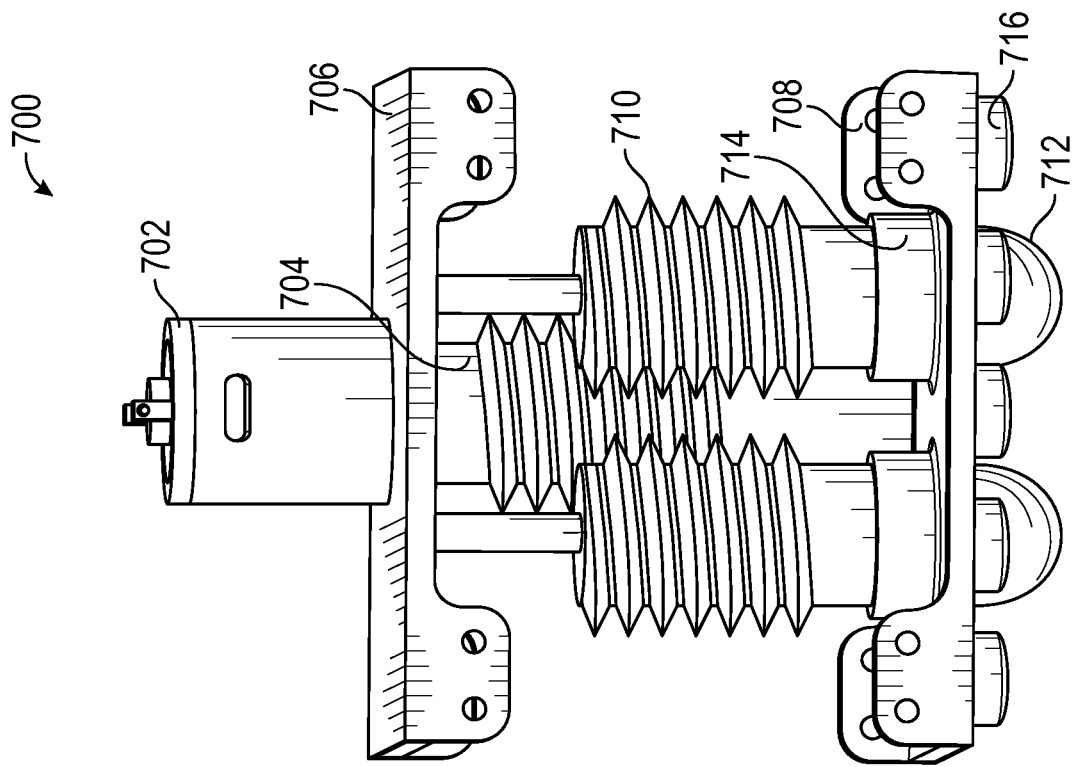
FIGS. 7A and 7B collectively illustrate an example stabilizer assembly of the present disclosure.
Figure 7B:
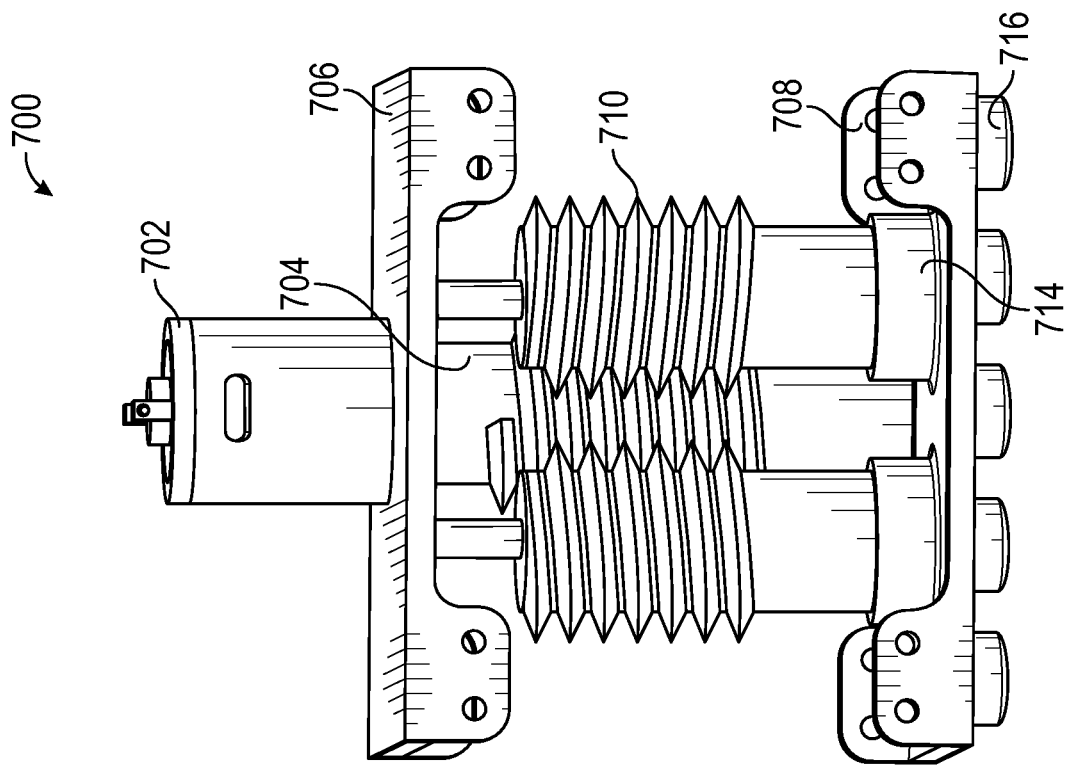
Figure 7C:
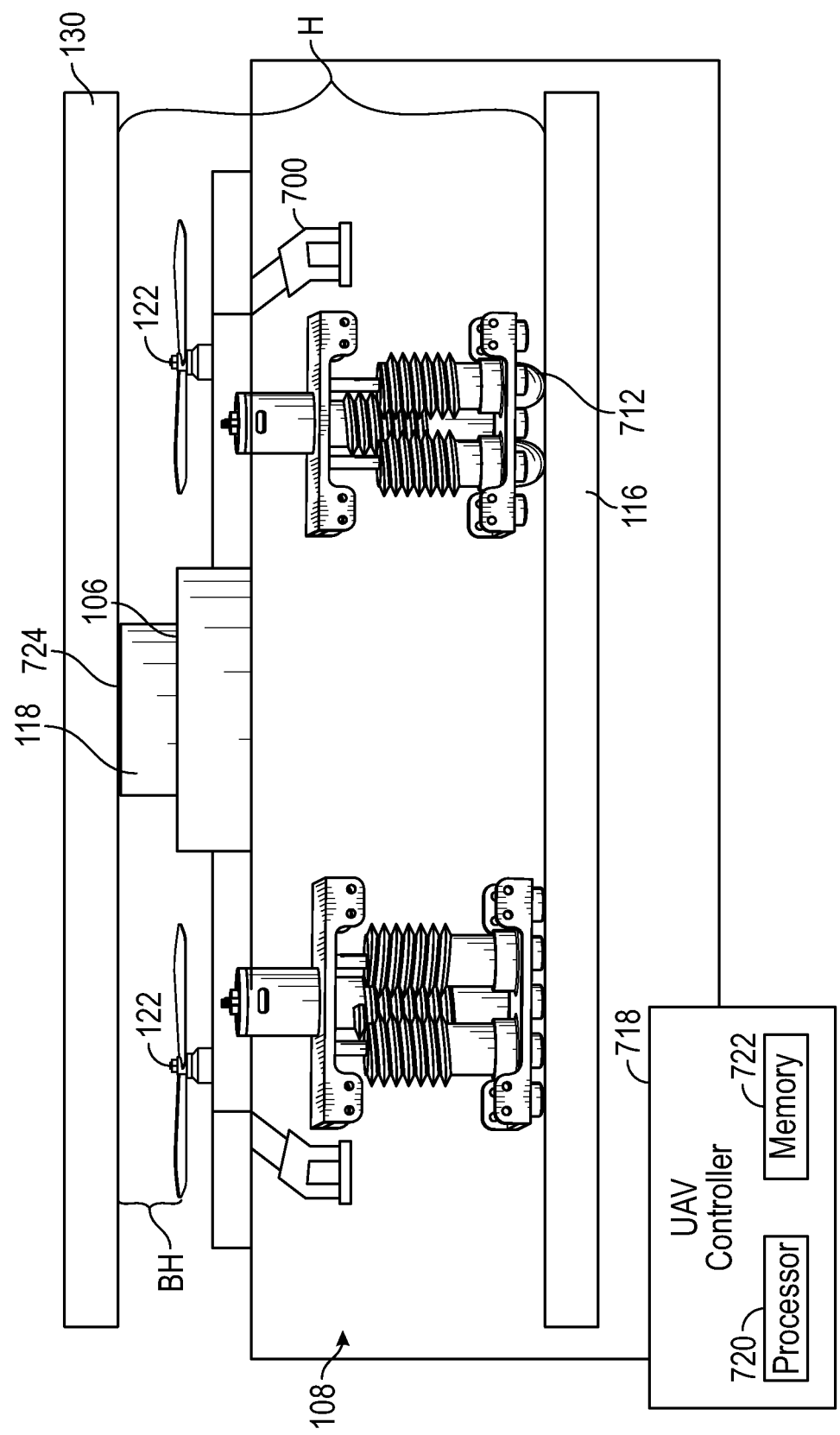
FIG. 7C illustrates an example apparatus of the present disclosure with a drone having one or more stabilizer assemblies as illustrated in FIGS. 7A and 7B.

FIGS. 7A and 7B collectively illustrate an embodiment of an example stabilizer assembly 700 that can be utilized with any of the embodiments of the apparatuses disclosed herein such as the embodiments of FIGS. 2A-6B. The stabilizer assembly 700 can be associated with a foot/landing member of a drone (see foot 120 of the drone 106 of FIG. 2A as an example). The stabilizer assembly 700 can also replace the foot/feet of the drone and can be directly coupled to a drone body of the drone (see drone body 118 of the drone 106 of FIG. 2A as an example).

In general, the stabilizer assembly 700 comprises a motor 702, an actuator 704, a top bracket 706, a contact plate 708, and a plurality of shafts such as shaft 710. In general, the motor 702 comprises any suitable motor such as an electric or hydraulic motor that is capable of rotating the actuator 704. In one embodiment, the actuator 704 can comprise a threaded member such as an auger or a worm gear that imparts rotational movement to the plurality of shafts such as shaft 710. That is, each of the plurality of shafts can have a threaded section that meshes with threads on the actuator 704. As the actuator 704 is rotated by the motor 702, this rotation is imparted to the plurality of shafts. As the plurality of shafts are rotated, ends of the plurality of shafts, such as end 712, can extend and retract through sleeves formed in the contact plate 708. For example, the end of shaft 710 extends through a sleeve 714 of the contact plate 708. In a retracted position as in FIG. 7A, the ends of the shafts are retracted upwardly allowing one or more protrusions such as protrusion 716 positioned on a lower surface of the contact plate 708 to act as a contacting surface(s) when an associated drone is positioned in an example apparatus of the present disclosure.

In one or more embodiments, the ends of the plurality of shafts can comprise a high-friction material, and the one or more protrusions can comprise a low-friction material. When using a high-friction material, the ends of the plurality of shafts resist movement relative to a contacting surface (such as a base member). Referring now to FIGS. 2B, 7A, and 7B, when the drone 106 is landing within the compartment 108, the plurality of shafts are in a retracted configuration such that the low-friction material of the one or more protrusions allows the drone 106 to slide into position in the compartment 108. When in position, the motor 702 is activated to extend the plurality of shafts allowing the end(s) thereof to contact the base member 116 to prevent rotation or sliding of the drone 106 relative to the base member 116. In some embodiments, the base member 116 can also be provided with a high-friction material.

In some embodiments, rather than tensioning the tether 202 using the reel 204, extension of the plurality of shafts can also create tension on the tether 202 when the drone 106 is in position on the base member 116, and the tether 202 has been retracted having no or little slack. When the tether 202 has been spooled onto the reel 204, the plurality of shafts are extended to place tension on the tether 202.

As noted in the embodiment of FIG. 1B, operation of the stabilizer assembly 700 can be controlled using the vehicle controller 132 and/or the HMI 134 that allows a user of an associated vehicle to launch, retrieve, and/or secure the drone 106. In another embodiment, the drone 106 can comprise a drone controller 718. In some embodiments the drone controller 718 is used to operate the stabilizer assembly/assemblies through direct or indirect control. In general, the drone controller 718 can comprise a processor 720 and a memory 722. The memory 722 can comprise instructions that are executed by the processor 720 to control the stabilizer assembly/assemblies. For example, the processor 720 of the drone controller 718 can activate the stabilizer assembly/assemblies in response to signals received from the vehicle controller 132 (see FIG. 1B).

In another embodiment, the plurality of shafts can be extended to increase an overall height H of the drone 106 to secure the drone 106 between the base member 116 and a retractable cover member 130. Also, in some embodiments, a drone body height BH allows an upper surface 724 of the drone body 118 to be higher than the rotors 122 so as to allow the drone body 118 to contact the retractable cover member 130 without contacting the rotors 122 of the drone 106. Thus, once the drone 106 is in position within the enclosure formed by the retractable cover member 130 and the base member 116, the plurality of shafts are extended until the ends of the plurality of shafts contact the base member 116, and the upper surface 724 of the drone body 118 contacts the retractable cover member 130.

Also, while the stabilizer assembly 700 has been disclosed as being associated with the drone 106, the stabilizer assembly 700 can alternatively be associated with the base member 116 such that the drone 106 lands on one or more of the stabilizer assemblies, and the plurality of shafts are extended or retracted when the drone 106 is in position on the stabilizer assemblies.

It will be understood that many different embodiments have been described herein, and each includes one or more drone securement assembly/assemblies. It will also be understood that other embodiments can include combinations of features of these varied embodiments. For example, one embodiment can include all of the drone securement assemblies disclosed herein. Any combination and permutation of embodiments and specifically drone securement assemblies disclosed herein is further contemplated. Also, additional features such as access apertures can be provided in each of the apparatuses allowing for vehicle cabin access to an associated drone.

EXAMPLE EMBODIMENTS

Example 1 may include an apparatus for stowing a drone, the apparatus comprising: a structural panel of a vehicle comprising a compartment configured to receive and retain the drone; a retractable cover member configured to at least partially cover the compartment to create an enclosure around the drone; and a drone securement assembly that retains the drone within the enclosure so as to prevent the drone from displacement during vehicle operation.

Example 2 may include the apparatus according to example 1, wherein the drone securement assembly comprises: a tether coupled to the drone; and a reel for retracting and releasing the tether, wherein the reel is configured to put the tether in tension to cinch the drone against a base member.

Example 3 may include the apparatus according to example 2 and/or some other example herein, further comprising at least one resilient member associated with either the drone or the base member, wherein when the tether is in tension the drone is drawn against the at least one resilient member.

Example 4 may include the apparatus according to example 3 and/or some other example herein, wherein the tether extends through the base member and at least one compression spring.

Example 5 may include the apparatus according to example 4 and/or some other example herein, further comprising a tether sleeve that is disposed between the tether and the at least one resilient member.

Example 6 may include the apparatus according to example 3 and/or some other example herein, wherein the at least one resilient member is mounted on a foot or a body of the drone.

Example 7 may include the apparatus according to example 1 and/or some other example herein, wherein the drone securement assembly comprises: at least one electromagnetic coil disposed within or on the base member; a magnet integrated into at least one of a foot or a landing guard of the drone; a voltage measurement circuit configured to sense a presence of the magnet when the drone is proximate to the at least one electromagnetic coil; and a controller that is configured to apply a current to the at least one electromagnetic coil to generate a magnetic field to attract the magnet of the drone.

Example 8 may include the apparatus according to example 1 and/or some other example herein, wherein the drone securement assembly comprises: a damping material disposed on an underside of the retractable cover member; and the base member configured to translate vertically to compress the drone against the damping material.

Example 9 may include the apparatus according to example 1 and/or some other example herein, wherein the drone securement assembly comprises: a damping material disposed on any of: an underside of the retractable cover member; or an upper surface of the base member; and wherein the retractable cover member is configured to translate downwardly towards the base member when covering the compartment to compress the drone against the damping material.

Example 10 may include a apparatus, comprising: a structural panel of a vehicle comprising a compartment that is defined by an angled sidewall and a base member formed in the structural panel, the compartment being configured to receive and retain a drone; and the drone comprising: a drone body; one or more landing members coupled to the drone body; and a stabilizer assembly coupled with the one or more landing members, the stabilizer assembly comprising: a contact plate configured to contact the base member; an actuator; a plurality of shafts that extend and retract through the contact plate via the actuator; and wherein when the plurality of shafts are extended, ends of the plurality of shafts contact the base member and the contact plate is spaced apart from the base member.

Example 11 may include the apparatus according to example 10, wherein the plurality of shafts comprise a high-friction material to prevent translation of the drone relative to the base member, and wherein the contact plate comprises one or more protrusions extending therefrom that comprise a low-friction material.

Example 12 may include the apparatus according to example 10 and/or some other example herein, wherein the base member comprises an access aperture allowing access to the drone from within a cabin of the vehicle.

Example 13 may include the apparatus according to example 10 and/or some other example herein, further comprising: a tether coupled to the drone; and a reel for retracting and releasing the tether, wherein the tether is tensioned by extending the plurality of shafts of the stabilizer assembly when the tether is in a retracted configuration.

Example 14 may include the apparatus according to example 10 and/or some other example herein, wherein the base member comprises an aperture allowing access to the drone from within a cabin of the vehicle.

Example 15 may include the apparatus according to example 10 and/or some other example herein, further comprising: at least one electromagnetic coil disposed within or on the base member; a magnet integrated into the drone; a voltage measurement circuit configured to sense a presence of the magnet when the drone is proximate to the at least one electromagnetic coil; and a controller that is configured to apply a current to the at least one electromagnetic coil to generate a magnetic field to attract the magnet of the drone.

Example 16 may include the apparatus according to example 10 and/or some other example herein, further comprising a retractable cover member configured to at least partially cover the compartment to create an enclosure around the drone.

Example 17 may include the apparatus according to example 16 and/or some other example herein, wherein the plurality of shafts are extended to compress the drone against either the retractable cover member or the base member to secure the drone.

Example 18 may include an apparatus, comprising: a structural panel of a vehicle comprising a compartment that is defined by an angled sidewall and a base member formed in the structural panel, wherein either the base member or a retractable cover member is configured to translate and compress a drone between the base member and the retractable cover member.

Example 19 may include the apparatus according to example 18, further comprising one or more mechanical actuators coupled to the base member, the one or more mechanical actuators comprising: a track coupled with the base member; and a motor configured to turn a gear coupled with the track, wherein translation of the track by the gear causes the base member to translate vertically towards the retractable cover member.

Example 20 may include the apparatus according to example 19 and/or some other example herein, further comprising: at least one electromagnetic coil disposed within or on the base member; a magnet integrated into at least one of a foot or a landing guard of the drone; and a controller that is configured to apply a current to the at least one electromagnetic coil to generate a magnetic field to attract the magnet of the drone.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An apparatus for stowing a drone, the apparatus comprising:
   a structural panel of a vehicle comprising a compartment configured to receive and retain the drone;
   a retractable cover member configured to at least partially cover the compartment to create an enclosure around the drone;
   a drone securement assembly that retains the drone within the enclosure so as to prevent the drone from displacement during vehicle operation, wherein the drone securement assembly comprises:
   a tether coupled to the drone and extending through a base member; and
   a reel for retracting and releasing the tether, wherein the reel is configured to put the tether in tension to cinch the drone against the base member;
   at least one resilient member associated with the base member, the at least one resilient member comprising a compression spring, wherein when the tether is in tension the drone is drawn against the at least one resilient member; and a tether protective sleeve in a concentric relationship with the resilient member that prevents the tether from contacting the at least one resilient member.

2. The apparatus according to claim 1, wherein the drone securement assembly comprises:
   at least one electromagnetic coil disposed within or on the base member;
   a magnet integrated into at least one of a foot or a landing guard of the drone;
   a voltage measurement circuit configured to sense a presence of the magnet when the drone is proximate to the at least one electromagnetic coil; and
   a controller that is configured to apply a current to the at least one electromagnetic coil to generate a magnetic field to attract the magnet of the drone.

3. The apparatus according to claim 1, wherein the drone securement assembly comprises:
   a damping material disposed on an underside of the retractable cover member; and
   the base member configured to translate vertically to compress the drone against the damping material.

4. The apparatus according to claim 1, wherein the drone securement assembly comprises:
   a damping material disposed on any of:
      an underside of the retractable cover member; or
      an upper surface of the base member; and
   wherein the retractable cover member is configured to translate downwardly towards the base member when covering the compartment to compress the drone against the damping material.

5. The apparatus of claim 1, wherein the reel is operated by a vehicle controller and a human machine interface of the vehicle.

6. The apparatus of claim 1, wherein the tether is further put in tension against the base member by an extension of a plurality of shafts when the tether is in position on the base member.

* * * * *